US012396072B2

(12) United States Patent
Mortimer et al.

(10) Patent No.: US 12,396,072 B2
(45) Date of Patent: Aug. 19, 2025

(54) MULTI-LAYER PARALLEL PLANE INDUCTOR WITH FIELD CONTROL POCKETS

(71) Applicant: RADYNE CORPORATION, Milwaukee, WI (US)

(72) Inventors: John Justin Mortimer, Genesee, WI (US); Roberto Bernardo Benedicto Ovando, Milwaukee, WI (US); David D. Schmidt, Milwaukee, WI (US)

(73) Assignee: Radyne Corporation, Milwaukee, WI (US)

( * ) Notice: Subject to any disclaimer, the term of this patent is extended or adjusted under 35 U.S.C. 154(b) by 945 days.

(21) Appl. No.: 17/529,799

(22) Filed: Nov. 18, 2021

(65) Prior Publication Data

US 2022/0159795 A1 May 19, 2022

Related U.S. Application Data

(60) Provisional application No. 63/115,276, filed on Nov. 18, 2020.

(51) Int. Cl.
*H05B 6/36* (2006.01)
*H05B 6/10* (2006.01)

(52) U.S. Cl.
CPC ............. *H05B 6/365* (2013.01); *H05B 6/104* (2013.01)

(58) Field of Classification Search
CPC ........ H05B 6/42; H05B 6/362; H05B 6/1245; H01F 41/061
See application file for complete search history.

(56) References Cited

U.S. PATENT DOCUMENTS 2,620,433 A * 12/1952 Denneen .................. H05B 6/40 219/674
2,714,648 A * 8/1955 Blok ...................... H05B 6/362 219/673
4,293,755 A * 10/1981 Hill ..................... C23C 16/4411 219/677
6,643,913 B2 * 11/2003 Uchikoba ........... H01F 17/0013 29/609
2010/0031771 A1 * 2/2010 Edlinger ................. C22B 9/003 75/10.14
2010/0109831 A1 * 5/2010 Podevels ............. H01F 27/2847 29/605
2018/0308612 A1 10/2018 Park et al.
2022/0304389 A1 * 9/2022 White ................. H01F 27/2804

FOREIGN PATENT DOCUMENTS

JP 2001035731 A * 2/2001
JP 3368871 B2 1/2003
JP 3707460 B2 10/2005
JP 2019153808 A 9/2019
JP 2019208004 A1 10/2019

* cited by examiner

*Primary Examiner* — Steven W Crabb
*Assistant Examiner* — Spencer H. Kirkwood
(74) *Attorney, Agent, or Firm* — Robert J. Everling

(57) ABSTRACT

A high current multi-layer parallel plane inductor is formed from a plurality of electrically conductive continuous layers folded back and forth to form a compact series inductor with each one of the plurality of electrically conductive layers having one or more layer pocket holes with layer edge notches forming one or more coil control pockets that generate a magnetic field pattern when alternating current is applied to the inductor.

19 Claims, 13 Drawing Sheets

MULTI-LAYER PARALLEL PLANE INDUCTOR WITH FIELD CONTROL POCKETS

This application claims priority to U.S. Provisional Application No. 63/115,276 filed Nov. 18, 2020, hereby incorporated by reference in its entirety.

FIELD OF THE INVENTION

The present invention generally relates to an inductor structure and method of making the same, and in particular, to a multi-layer parallel plane inductor formed from a plurality of electrically conductive continuous layers connected in a serpentine manner alternating back and forth to form a compact series inductor with the plurality of electrically conductive layers having one or more coil control pockets with each coil control pocket formed by a layer pocket hole in each one of the plurality of electrically conductive layers with the layer pocket holes in all of the plurality conductive layers coordinately arranged with pocket hole edge notches to generate a magnetic field pattern in the coil control pockets when an alternating current is applied to the multi-layer parallel plane inductor.

BACKGROUND OF THE INVENTION

In induction heating applications, a variable magnetic field is used to heat up an electrically conductive object (induced object). The variable magnetic field is produced by the electric current that flows in an electrical conductor that is commonly called an inductor also known commonly as an induction coil (or heater). When a conductive object is exposed to the variable magnetic field, eddy electric currents are induced in the electrically conductive object itself. The magnitude and direction of travel of the eddy electric currents depends on the physical, electrical and magnetic properties of the inductor and the induced object. The eddy electric currents produce Joule power losses that heat the induced object. The power losses in the induced object increase as the magnitude and frequency of the inductor's electric current increases. Usually, solenoidal, pancake and channel inductors (or heaters) are implemented in induction heating systems to transfer the electrical energy from the power supply to the induced object. Depending on the application, the shape and the size of the induction coil is adjusted to fit the electrical and cooling requirements of the power supply and the coil itself.

Solenoidal inductors are commonly implemented for the induction heating treatment of cylindrical shaped electrically conductive objects. Solenoidal inductors are built with single or multiple turn layers by using electrically conductive tubing pipe materials. Generally, flow of a cooling medium, such as water, is injected into the hollow interior of the tubing pipe to avoid overheating and resultant damage to the inductor. A solenoidal inductor produces a heat pattern that can be limited to surround the induced object. The extension and distribution of the heat pattern depends on the length of the inductor, the inductor opening diameter and the turns spacing if the inductor is of multiturn construction. Similarly, the intensity of the induced power depends on the coupling distance between the induced object and the inductor, the number and space factor of the turns, as well as the magnitude and frequency of the electric current. In order to conform to the energy requirements of the power supply, and to increase the amount of induced power, it is necessary to modify the opening of the inductor, the length of the inductor and/or the number of turns, as well as the magnitude and/or frequency of the electric current. However, frequently, the physical changes that are implemented to improve the power supply to inductor interaction, (for example, increasing the number of turns and/or the diameter of the inductor winding) lead to modifications of the induced heat distribution since the heat pattern that is produced by a solenoidal inductor is directly controlled by the turns spacing and inductor dimensions. Additionally, in high frequency and high electric current induction heating applications, where higher cooling fluid flow rates are required for cooling the inductor, bigger tubing pipe sizes are implemented which adds additional restrictions that need to be taken into consideration at the inductor design stage to achieve a desired heat pattern.

On the other hand, pancake-type inductors are usually applied in induction heating treatment of planar or concave surfaces where a solenoidal inductor cannot be implemented due to the required heat pattern or space limitations. Pancake-type coils are built with electrically conductive tubing pipe in a single or multiple turn layers that are wound in a spiral configuration. A cooling flow, commonly water, is injected in the hollow interior of the tubing pipe to avoid overheating damages in the inductor. Pancake-type inductors produce a flat heat pattern that is similar to the heating face of the pancake coil itself. The extension of the heat pattern depends on the surface area of the heating face and the space between turns. The intensity of the induced power depends on the coupling distance between the induced object and the pancake-type coil, the number of coil turns and the space factor between turns, as well as the magnitude and the frequency of the electric current supplied to the inductor. In a pancake-type inductor, it is necessary to modify the number of turns and the spacing distance between turns, as well as the magnitude and/or the frequency of the electric current supplied to the inductor, to conform with the electrical requirements of the power supply. In comparison with a solenoidal inductor, the adjustments that are implemented to improve the power supply to inductor interaction (for example, increasing the number of turns and/or the distance between turns) causes changes in the induced heat distribution due to the heat pattern that is produced by the pancake-type inductor which is also directly dependent on the turns spacing and the dimensions of the inductor. Furthermore, in high frequency and high electric current induction heating applications, the high cooling fluid flow that is required for the coil demands bigger tubing pipe sizes or the use of high pressure pumps which introduce additional restrictions that need to be considered in the inductor design stage to achieve a desired heat pattern.

Likewise, channel-type inductors (also known as tunnel coils) are non-flat pancake coils that are commonly applied for the simultaneous induction heating of two surfaces of a planar or a concave object with the purpose of meeting a heat treatment requirement and/or fit to a physical space limitation. Channel coils are also built as a single turn coil or layers of multiple turns by using electrically conductive tubing pipes that are cooled with a fluid flow of a cooling medium to avoid overheating damages in the coil. Channel coils produce a surrounding heat pattern that is more pronounced at those sides where the induced object is closer to the two channel heating faces of the coil. The extension of the heat pattern depends on the surface area of the two channel heating faces and the space between turns of the coil. Also, the intensity of the induced power depends on the coupling distance between the induced object and the heating faces of the channel coil, the number of coil turns and the space factor between turns, as well as the magnitude and frequency of the electric current. Similar to solenoidal and pancake-type coils, the number and space distance between coil turns, as well as the magnitude and/or the frequency of the electric current in a channel coil, can be adjusted to fit the electrical requirements of the power supply. However, the adjustments that are implemented to improve the power supply to coil interaction produce changes in the induced heat distribution due the heat pattern that is created by the channel coil is also directly dependent on the space ratio between coil turns and the dimensions of the coil. Once more, in high frequency and high electric current induction heating applications, the high flow rate of a cooling medium that is needed to avoid the coil overheating requires bigger tubing pipe sizes that add spatial restrictions that need to be considered in the design of the coil to achieve a particular heat pattern.

In conclusion, in a solenoidal, pancake-type or channel-type induction coil; the coil dimensions, the number of coil turns and the space factor between coil turns can be modified to fit the electrical and cooling requirements of the power supply and the coil itself. However, the adjustments that are implemented to improve the electrical performance of the coil to part (workpiece being inductively heated) interaction and/or to satisfy the power supply and cooling requirements frequently produce changes in the heat distribution due to difficulty in maintaining tolerances and repeatability of the coil windings, as well as the tolerance and repeatability of the space factor between coil turns.

It is one object of the present invention to provide a high current induction heating inductor with a structure that produces a localized and precise induction heating pattern in a straight, tapered, cylindrically oriented body, or other shapes and orientations.

It is another object of the present invention to provide a high current induction heating inductor with a structure that produces and enhances the strength of the magnetic energy distribution when more than two coil control pockets are provided in the inductor coil structure.

BRIEF SUMMARY OF THE INVENTION

In one aspect the multi-layer parallel plane inductor of the present invention produces a localized and precise heating pattern at any straight, tapered, cylindrically oriented body, or other shapes and orientations. The heating pattern that is produced is controlled by the thickness and the separation gap between each copper layer as well as by adjusting the size of the multi-layer parallel plane inductor's control pocket holes.

In another aspect the multi-layer parallel plane inductor of the present invention enhances the magnetic energy strength at the heating zone when the stacked coil has more than two coil control pockets.

The multi-layer parallel plane inductor of the present invention can be cooled by natural convection or forced convection mechanisms depending on the magnitude of the surface area of each copper layer and the current required in a particular application.

In another aspect the present invention is a method of forming a multi-layer parallel plane inductor of the present invention with efficient simulation and fabrication with precise repeatability for uniform performance of a particular multi-layer parallel plane inductor of the present invention over multiple physically and electrically identical multi-layer parallel plane inductors.

In another aspect the present invention is a stacked coil and method of forming a stacked coil with a heating pattern that is easily improved and modified by changing the dimensions of the copper layer thickness of the multi-layer parallel plane inductor, the gap between copper layers of the stacked coil and the diameter of the holes in each copper layer of the stacked coil. More than one different copper layer thickness can be used in the same stacked coil of the present invention to achieve precision and a controlled heat pattern. All dimensions of the copper layers in a multi-layer parallel plane inductor of the present invention can be adjusted to fit the electrical requirements of a power supply used in a particular application as well as to an available cooling system without affecting the required heat pattern.

In another aspect the present invention is a multi-layer parallel plane inductor having a plurality of interchangeable copper layers that can be changed to suit the frequency of operation of a power supply in a particular application without affecting the required heat pattern.

In another aspect the present invention is a stacked coil that allows for multiple parts to be positioned end-to-end and in undefined electrical contact within the coil without inducing arcing between the parts at that point of electrical contact.

These and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 2:
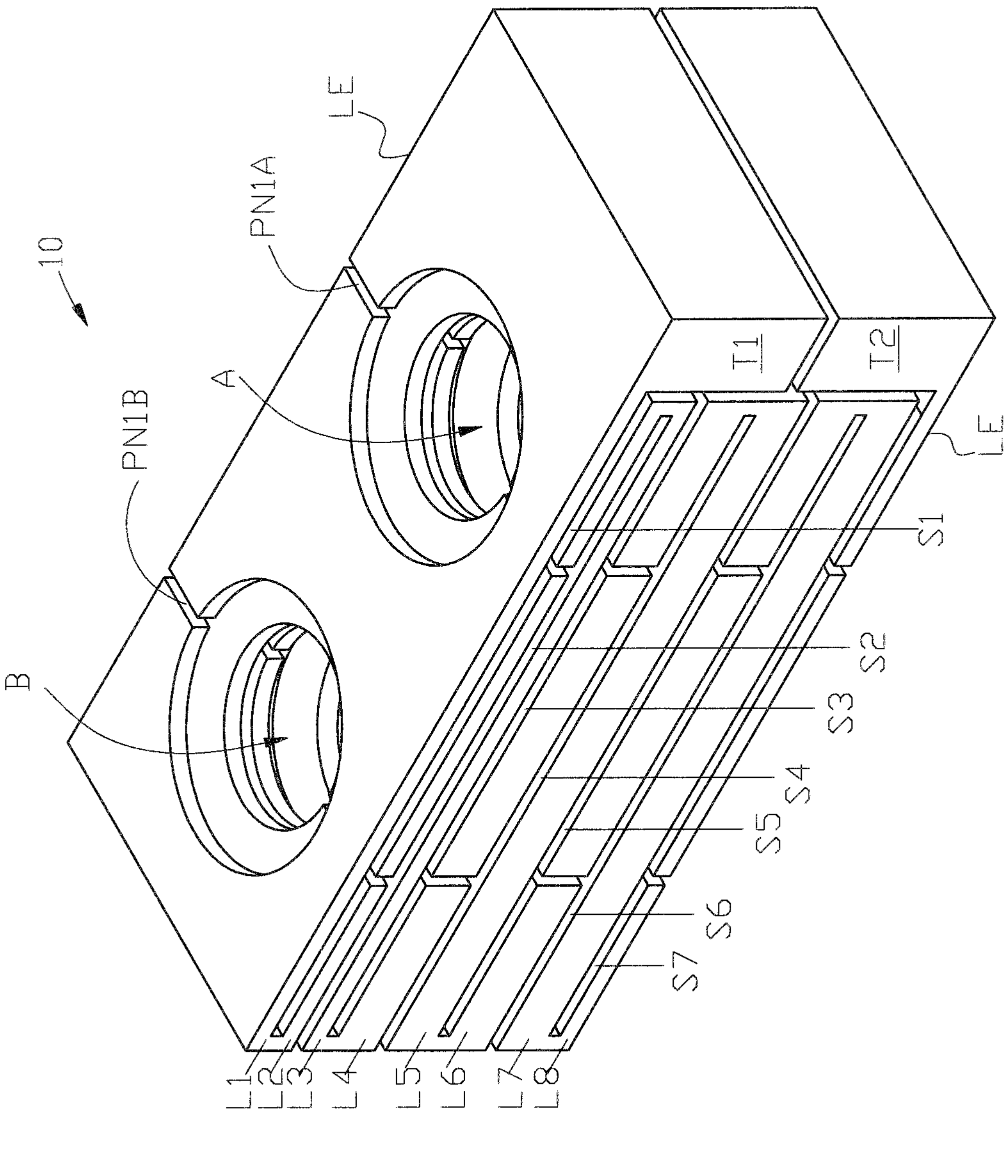
FIG. 2 is a perspective view of one non-limiting example of a high current multi-layer parallel plane inductor of the present invention showing top, right side and front view of the inductor where the inductor includes two magnetic field control pockets A and B in the high current multi-layer parallel plane inductor of the present invention. A magnetic field control pocket is also referred to as a coil control pocket.
Figure 3:
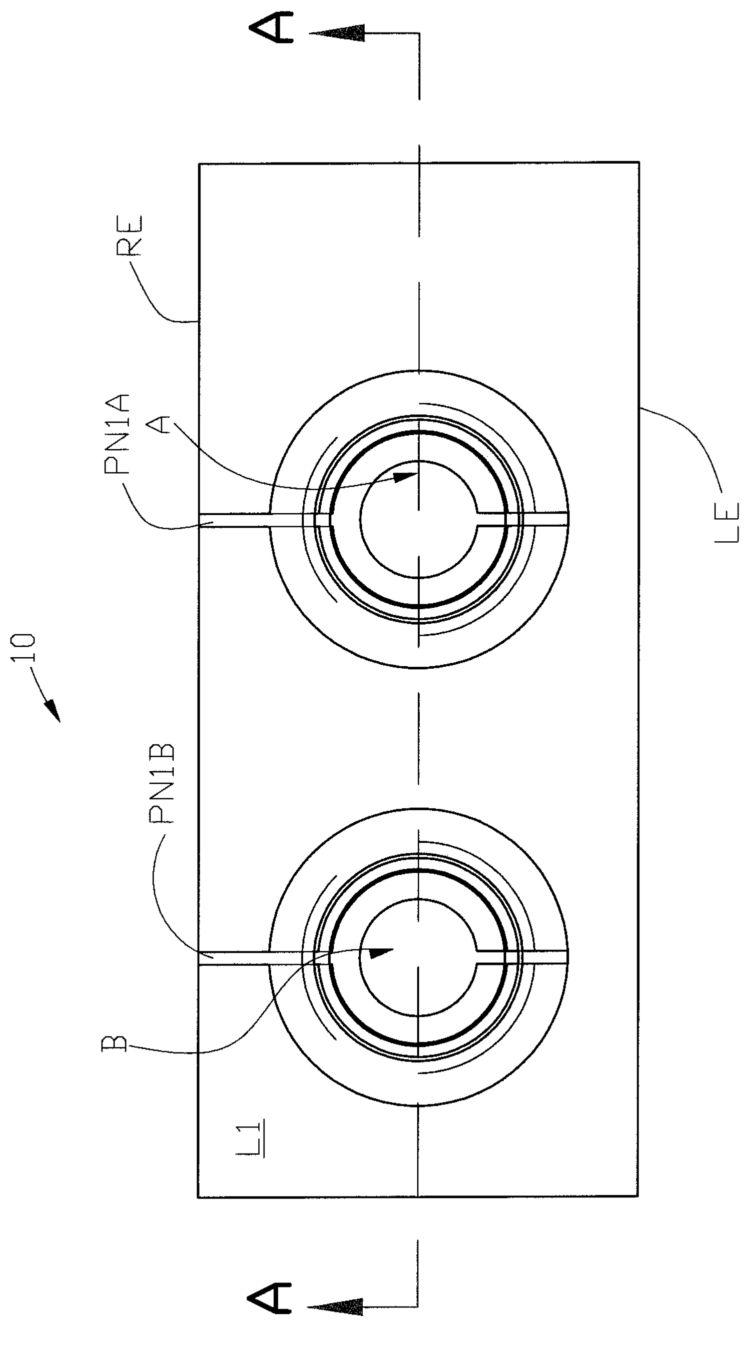
FIG. 3 is a top plan view of the multi-layer parallel plane inductor illustrated in FIG. 2.
Figure 4:
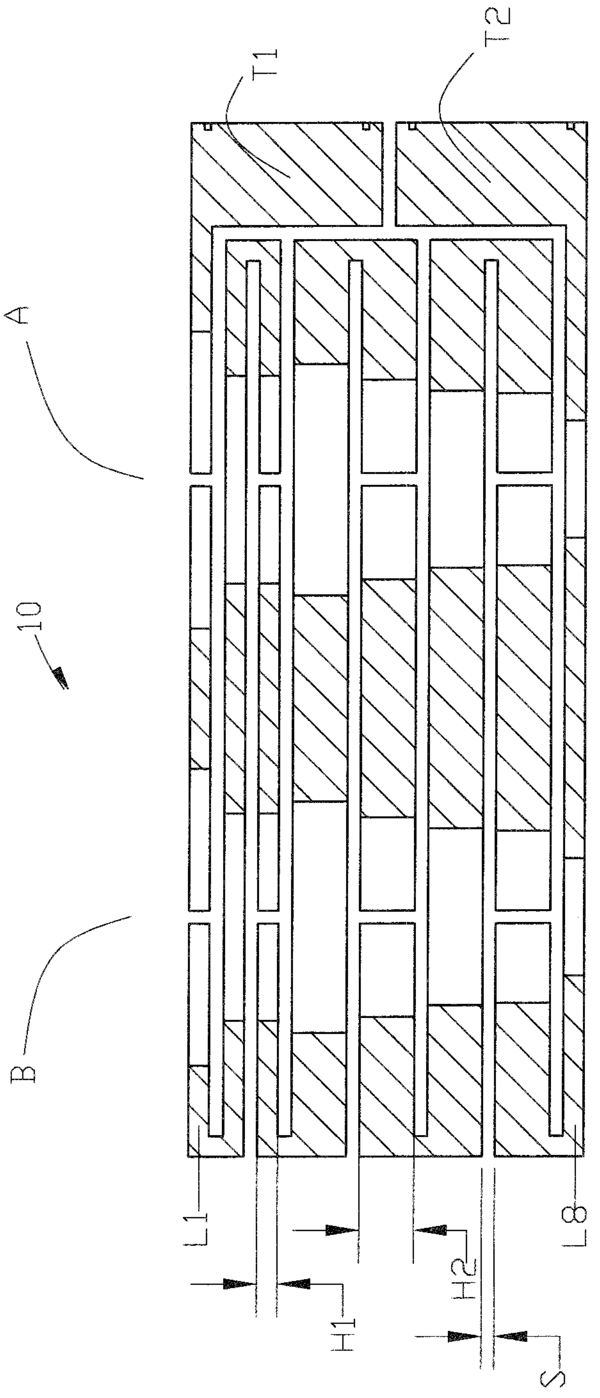
FIG. 4 is an interior sectional cut A-A of the multi-layer parallel plane inductor illustrated in FIG. 2.
Figure 5:
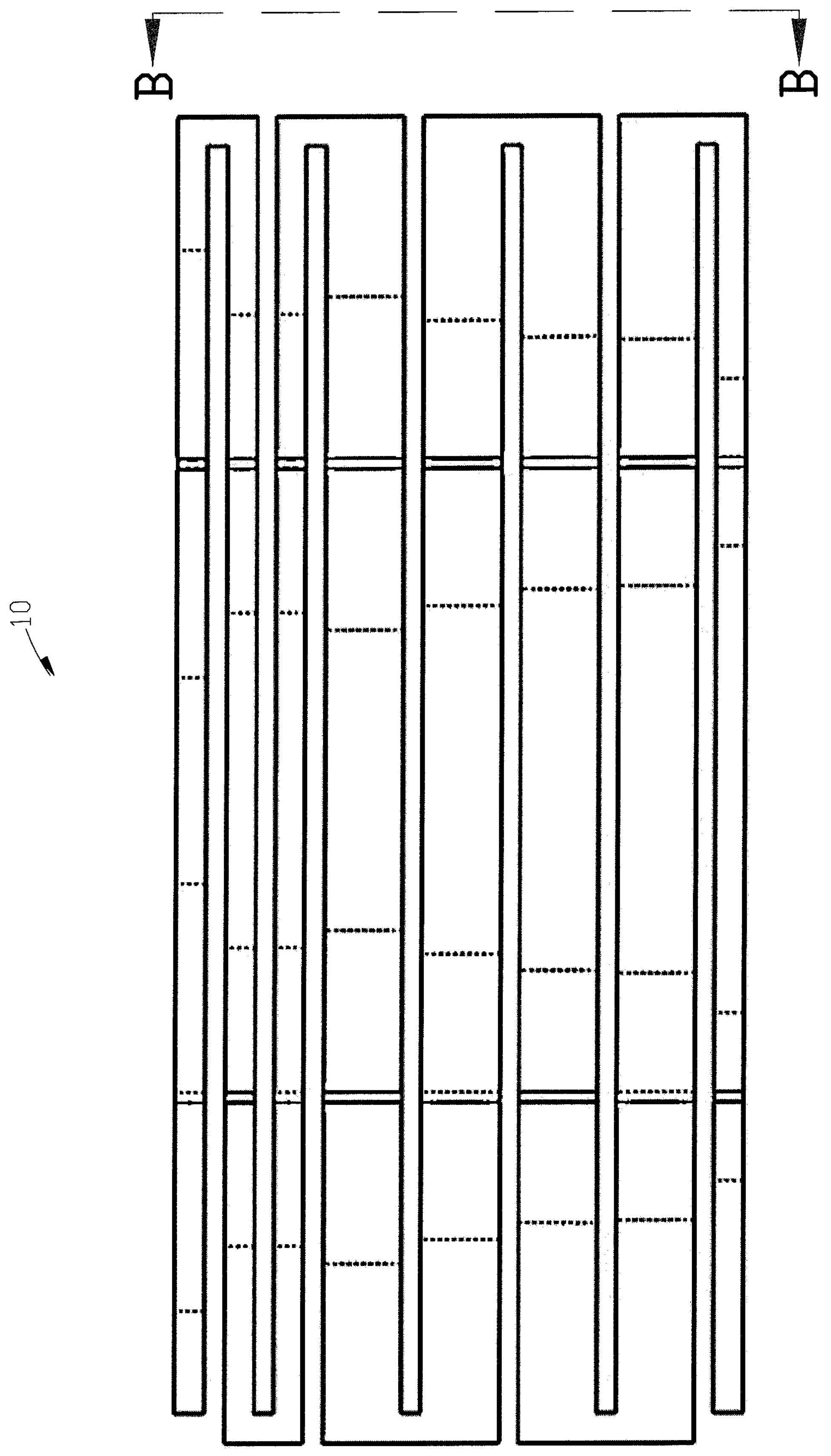
FIG. 5 is a front elevation plan view of the multi-layer parallel plane inductor in FIG. 2.
Figure 6:
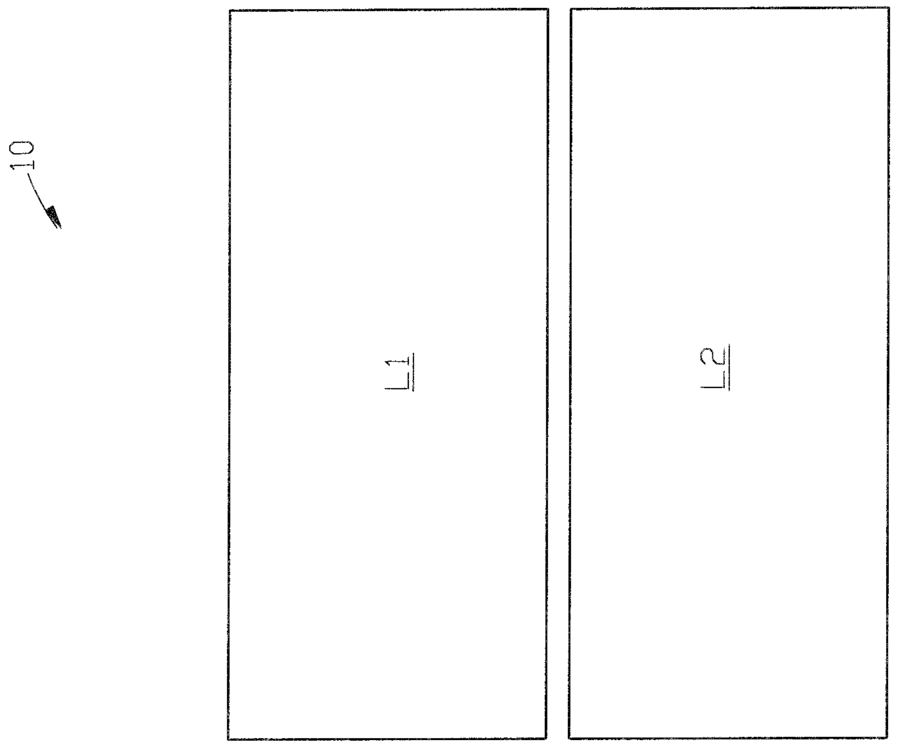
FIG. 6 is a left side elevation view of the multi-layer parallel plane inductor in FIG. 2 illustrating opposing inductor terminations T1 and T2 that in this non-limiting example where inductor termination T1 is formed as an integral part of first (top) layer L1 and inductor termination T2 is formed as an integral part of second (bottom) layer L8.

One non-limiting embodiment of a high current multi-layer parallel plane inductor 10 of the present invention is illustrated in FIG. 2. The multi-layer parallel plane inductor is also referred to as a multi-layer parallel plane induction heating coil. The multi-layer parallel plane inductor is formed from electrically conductive continuous layers folded back and forth and separated from each other by a separation gap height S that can vary between layers. The thickness (height) of each electrically conductive layer L1 through L8 can also be variable for example as illustrated by layer heights H1 and H2 in FIG. 4. Further each layer can be constructed so that the separation gap height and the layer height varies along the length of a single layer. The variable dimensions are adjustable in manufacturing of the inductor and can be varied to match inductor performance requirements for a particular application, such as a required operational temperature profile and required electrical impedance. By way of example and not limitation, an inductor of the present inductor formed from solid electrically conductive material is suitable for use in "high current" applications up to at least 100 amperes in alternating current at 50 volts.

Figure 1:
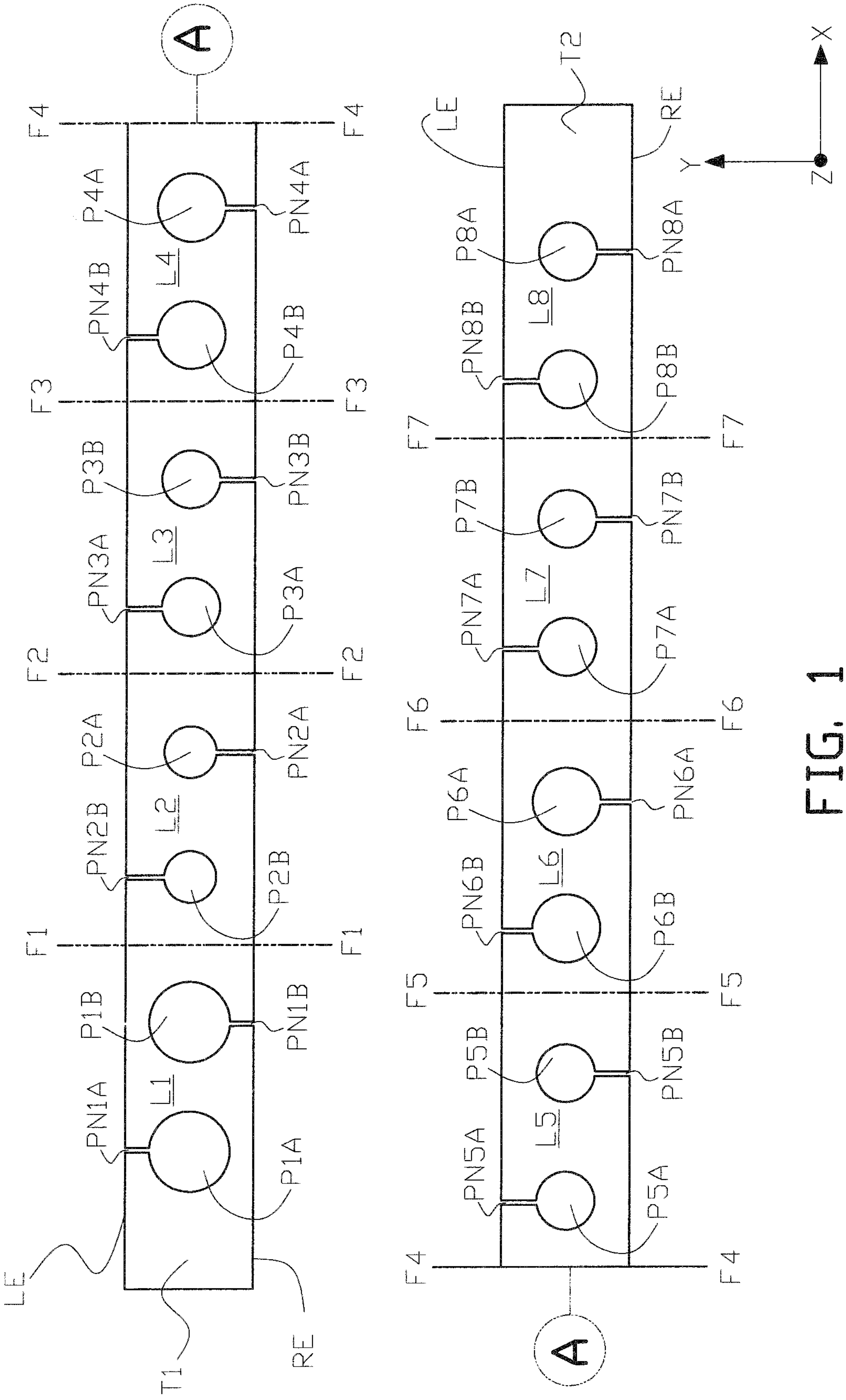
FIG. 1 is a diagrammatic representation of a top plan view of one non-limiting embodiment of a high current multi-layer parallel plane inductor of the present invention laid out linearly in eight layers before the layers are folded back and forth from each other and with two pocket holes on each layer and one type of alternating pattern of first edge notch and second edge notch associated with the pocket holes in each layer.
Figure 8A:
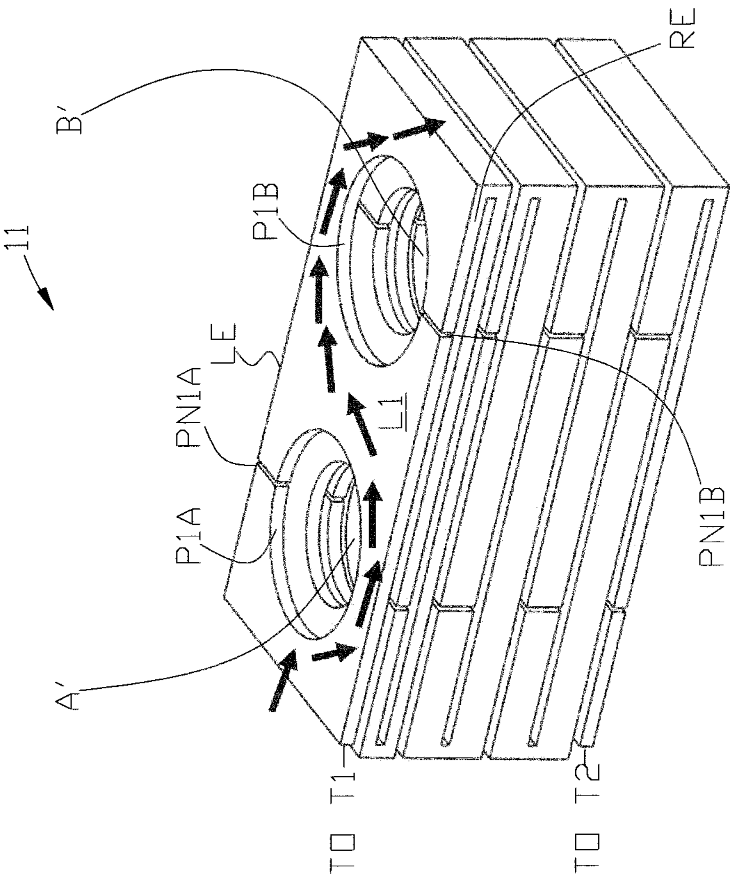
FIG. 8(*a*) and FIG. 8(*b*) illustrate use of one type of sequential inductor layer edge notching patterns for layer pocket holes for a non-limiting example of a high current multi-layer parallel plane inductor of the present invention where the inductor includes two magnetic field control pockets A' and B' wherein the at least one layer pocket hole in each one of the plurality of electrically conductive continuous layers comprises two pocket holes in each one of the plurality of electrically conductive continuous layers and the two pocket holes on each layer sequentially having alternating first edge (LE) notch and second edge (RE) notch.
Figure 8B:
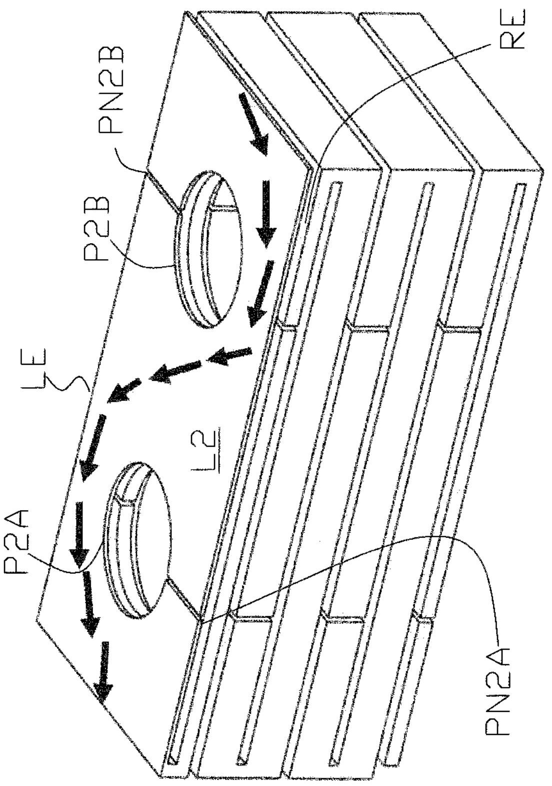

In one method of manufacturing a multi-layer parallel plane inductor of the present invention stock material of suitable electrically conductive material can be machined by a computer numerical control (CNC) mill or by waterjet and then folded back and forth over itself with material handling equipment known in the art including one or more tools selected from machine tools, die presses, water jets and wire electrical discharge machining to reveal the elements of the high current multi-layer parallel plane inductor to form the multiple layers of a single inductor of the present invention without requirements for inductor brazed joints. FIG. 1 is a diagrammatic representation of one example of the present invention prior to folding back and forth along fold regions F1 to F8. FIG. 8(*a*) illustrates one example of the resulting high current multi-layer parallel plane inductor 11 resulting after the folding back and forth step has been completed in FIG. 1.

Solid copper or copper alloy is one non-limiting example of an electrically conductive material suitable for the electrically conductive continuous layers of the present invention. By way of example and not limitation 4×4 copper bar 10 inches long is suitable for milling and/or water-jetting formation of the electrically conductive continuous layers in one embodiment of the invention.

Each electrically conductive layer of the plurality of electrically conductive layers has one or more sets of pocket holes that control both the magnetic coupling and the temperature profile in a straight, tapered or cylindrically-shaped orientation, or other shapes or orientations as required for a particular application and thus are referred to as coil control pockets or magnetic field control pockets.

Each pocket hole is split (or notched) exclusively at one selective side edge of the electromagnetically conductive layer to mimic in an inductor of the present invention the electric current and the magnetic flux distribution that is produced with a comparative solenoidal coil. The pocket hole in each layer commutes from left edge (LE) notches (or splits) to right edge (RE) notches (or splits) between consecutive electrically conductive layers. The surface area of each electrically conductive layer is adjusted to allow natural air cooling, natural water cooling or forced convection cooling depending on a particular application's cooling requirements. Any current created by capacitive coupling and the electrodynamic voltage difference between the top and bottom layers of an inductor of the present invention is coaxial with a magnitude dependent upon coupling distance; voltage; and material properties and the geometry of the inductor and load (workpiece) being heated in or around at least one of the coil control pockets.

Alternative configurations of layer pocket holes with edge notches are utilized in different embodiments of the invention. Common to the following alternatives is that pocket edge notches reverse layer side edges between two adjacent layers. That is, between two adjacent layers, pocket holes with layer right side edge (RE or first edge) notches and pocket holes with layer left side edge (LE or second edge) notches in the first of the two adjacent layers will have companion pocket holes with reversed layer left side edge notches and companion pocket holes with reversed layer right side edge notches in the second of the two adjacent layers. This reversed pairing of adjacent companion holes is followed with all companion pocket holes on all layers that form one of the coil control pockets.

Companion pocket holes refers to all of the pocket holes on all layers that form one coil control pocket. For example FIG. 1 represents the multi-layer parallel plane inductor in FIG. 8(*a*) where pocket holes P1A on layer L1, P2A on layer L2, P3A on layer L3, P4A on layer L4, P5A on layer L5, P6A on layer L6, P7A on layer L7, and P8A on layer L8 are the eight pocket holes on the eight layers that are all companion pocket holes that form coil control pocket A' in FIG. 8(*a*).

FIG. 1 illustrates a non-limiting configuration with two pocket holes per layer with the pair of companion pocket holes for coil control pockets A' and B' on opposing layer side edges. For example for top layer L1 pocket hole P1A has edge notch PN1A on the left edge (LE) of layer L1 and pocket hole P1B has edge notch PN1B on the right edge (RE) of layer L1. On the next layer L2 below top layer L1 when layer L2 is folded at fold F1 under layer L1, pocket P2A with pocket notch PN2A is companion to pocket P1A on Layer 1 with edge notch PN1A. The configuration in FIG. 1 is the same configuration shown in FIG. 8(*a*) for layer L1 and layer L2 (layer L1 is removed in FIG. 8(*b*) to make layer L2 visible) respectively after the layers in FIG. 1 have been folded back and forth underneath each other to assemble multi-layer parallel plate inductor 11 in FIG. 8(*a*). This two layer (L1 and L2) edge notch pattern repeats for two layer pairs L3 and L4; L5 and L6; L7 and L8 to form each of the two separate coil control pockets designated A' and B' in FIG. 8(*a*).

Figure 9B:
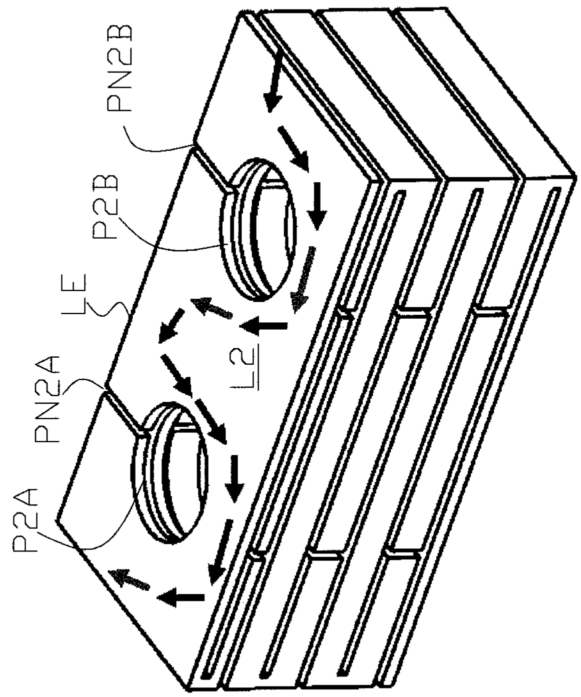
FIG. 9(*a*) and FIG. 9(*b*) illustrate use of another type of sequential repetitive two-layer notching of the present invention. In this example sequential inductor layer edge notching patterns for layer pocket holes for a non-limiting example of a high current multi-layer parallel plane inductor of the present invention is where the inductor includes two magnetic field control pockets A and B wherein the at least one layer pocket hole in each one of the plurality of electrically conductive continuous layers comprises two pocket holes in each one of the plurality of electrically conductive continuous layers and the two pocket holes on each layer sequentially having alternating layers with the first layer L1 having first edge RE notches and the second layer L2 having second layer edge LE notches. That is Layer L1 notches are on the same edge side that is the RE side and Layer L2 notches are on opposing side LE.
Figure 9A:
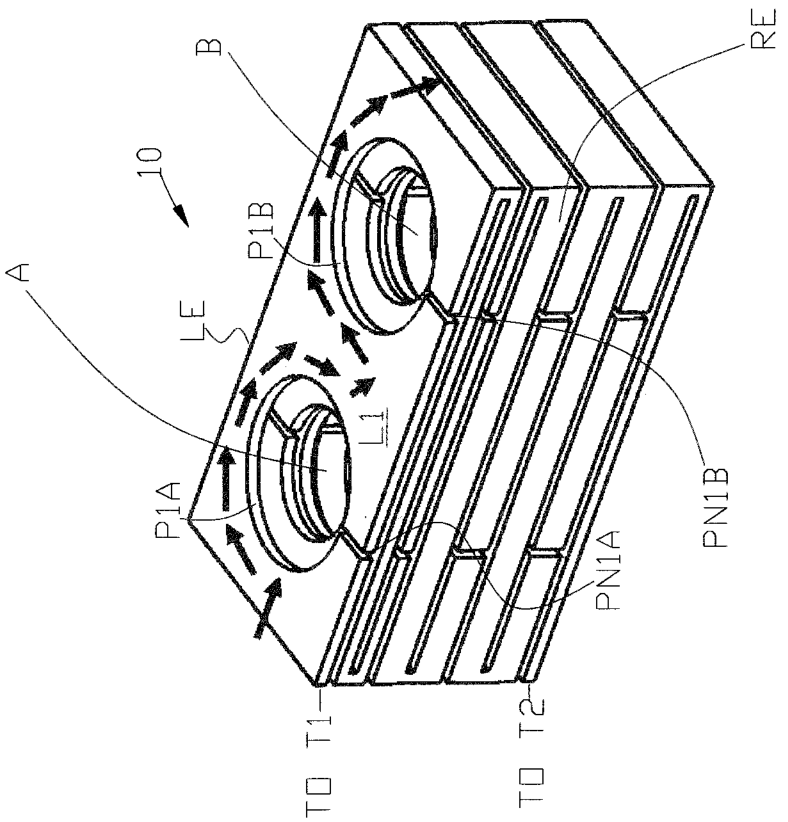

FIG. 2 illustrates another non-limiting configuration with two pocket holes per layer with the pair of companion pocket holes on the same layer edge (RE) of layer L1 and the pair of companion pocket holes on the opposing adjacent layer opposing layer side edges. This two layer (L1 and L2) edge notch pattern repeats for two layer pairs L3 and L4; L5 and L6; L7 and L8 to form each of the two separate coil control pockets designated A and B in FIG. 2 and FIG. 9(*a*) wherein the pocket holes for alternating ones of the plurality of electrically conductive continuous layers have layer L1 with right edge notches in the first alternating layer and L2 layer second left edge notches in the second alternating layer.

The stack of electrically conductive layers folded back and forth and the orientation of the layer pocket hole with layer edge notches forming coil control pockets make it possible to retain the magnetic field performance of a solenoidal coil while significantly improving the precision, repeatability and rapid design adjustments during the design, construction and testing cycles of an induction heating coil of the present invention. When a multi-layer parallel plane inductor of the present invention is manufactured by CNC machining or water jetting the coil control pockets with layer pockets and layer edge notching with subsequent wire electrical discharge machining (EDM) can form the layers from a solid electrically conductive block of material. Additionally, unlike CNC traditional stepped or helical type machined type inductors no subsequent brazing operations are required to create water-cooled closures for the inductor. These subsequent brazing operations in the prior art create dimensional distortions that are detrimental to inductor performance.

Electrically conductive layers may be designed and fabricated individually but act in a group to achieve a localized and precise induction heat pattern. The design and fabrication of each electrically conductive layer is independent from the design and fabrication of the remainder of electrically conductive layers in the assembly forming a multi-layer parallel plane inductor of the present invention. Because of this feature, each electrically conductive layer can be designed according to the level of electric power performance and cooling that is necessary at that specific electrically conductive layer of the inductor. Despite each electrically conductive layer being designed and fabricated individually and independently from the remaining electrically conductive layers in the present invention, when the inductor is assembled all of the electrically conductive layers are electrically connected in series to approximate but improve upon the magnetic field performance of a traditional helical solenoidal inductor.

The stacked electrically conductive layers of a multi-layer parallel plane inductor of the present invention mimic the thermal performance of a conventional heat exchanger. The design of each electrically conductive layer can be modified and adjusted according to the available cooling system capabilities. Each electrically conductive layer acts as a heat sink that makes possible the cooling of an assembled inductor by natural or forced convection, or conduction mechanisms.

A multi-layer parallel plane inductor of the present invention has advantages of fabrication and adjustments repeatability. The characteristic electrically conductive layered configuration of a multi-layer parallel plane inductor of the present invention facilitates construction and modification of the inductor since the dimension of each specific circular cut for a layer pocket and each specific layer edge cut from each layer can be achieved with precise machining processes and tools.

A multi-layer parallel plane inductor of the present invention has advantages of eliminating prior art tubing pipe size limit. The thickness of each electrically conductive layer is independent from the thickness of the remainder of the electrically conductive layers forming the inductor of the present invention and the thickness can be adjusted according to the level of electrical power and cooling that is needed at a specific layer without affecting the inductor's heating pattern.

A multi-layer inductor of the present invention has advantages of eliminating matching frequency limit for proper operation of the power supply with which the multi-layer parallel plane inductor coil is used. The design of a stacked coil of the present invention is not limited to a certain number of turns. Therefore, an inductor of the present invention significantly facilitates the matching process with a power supply without affecting the heating pattern and the electromagnetic performance of the inductor coil itself.

Figure 7:
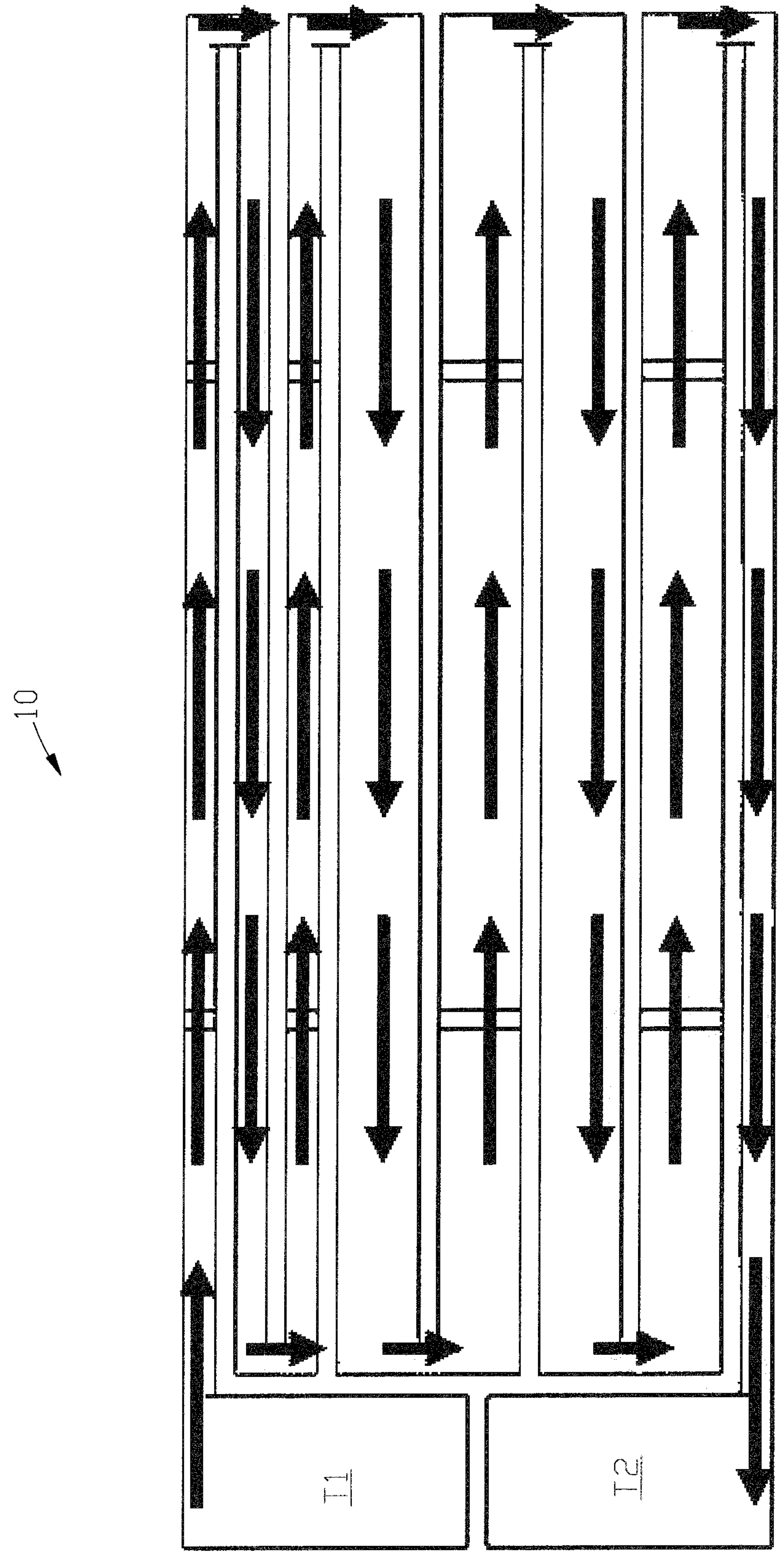
FIG. 7 illustrates with arrows direction of instantaneous alternating current flow in one direction when alternating current is applied to the inductor terminations T1 and T2 in FIG. 2.

When a multi-layer inductor of the present invention is energized, at one instant in time, alternating current travels from first end inductor terminal T1 to the second end inductor terminal T2 through each layer and follows a ladder-like pattern as indicated by the arrows in FIG. 7 using the embodiment of inductor 10 in FIG. 2 as an example. The ladder-like current pattern makes possible the change in direction of the electric current from left to right and vice versa for each layer as shown in FIG. 7. The inductor 10 in FIG. 2 has terminals Tl and T2 integrally formed with the first layer and the final layer respectively to facilitate connection to external circuit conductors such as cabling or buswork. Alternatively, in some embodiments of the invention as shown in FIG. 8 (*a*) separate inductor terminals may be connected to the ends of the first and final layers.

On the other hand in the example of the invention shown in the drawings, the direction of current at each single layer is changed between up and down and the opposite way around each of the layer pockets on a layer by interchanging the position of the layer edge notch for adjacent pockets on a layer. For example, in FIG. 8(*a*) as indicated by the arrows, first layer L1 current from terminal T1 travels from left to right down around layer L1 first pocket P1A with upper (layer left edge LE) pocket notch and then right to left up around layer L1 second pocket P1B with lower (layer right edge RE) pocket notch. In this example, in FIG. 8(*b*) (with layer L1 removed) the next layer L2 current travels from right to left down around L2 first pocket P2B with upper (layer left edge LE) pocket notch and then left to right up around layer L2 second pocket P2A with lower (layer right edge RE) pocket notch as it is shown in FIG. 8(*b*). This two-layer pattern of pockets and associated pocket edge cuts (notches) follow until terminal T2 connected to the left end of final inductor layer L8 is reached.

Figure 10:
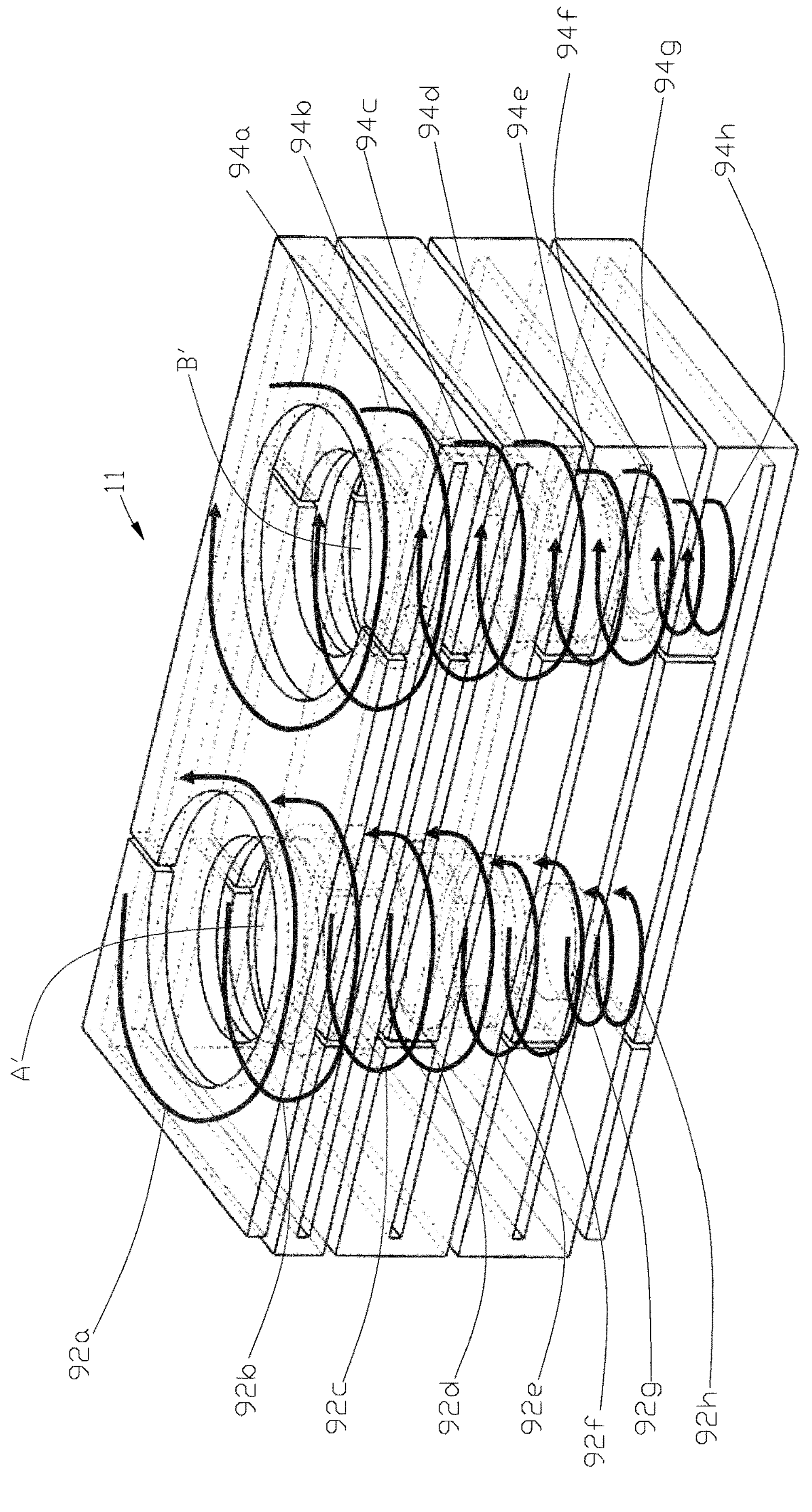
FIG. 10 illustrates one example of a vortex of current at each pocket produced by the ladder-like current pattern between layers and the positioning of the pocket hole edge cuts between layers.

From the point of view of a load (workpiece) placed at least partially inside one of the coil control pockets when alternating current is supplied to an inductor of the present invention, the overall current motion and direction produced by the ladder-like current pattern between layers and the positioning of the pocket hole edge cuts (notches) between layers generates a vortex of current (92*a* through 92*h* for coil control pocket A' and 94*a* through 94*h* for coil control pocket B') at each pocket as illustrated in FIG. 10 for one example of the invention.

Figure 11:
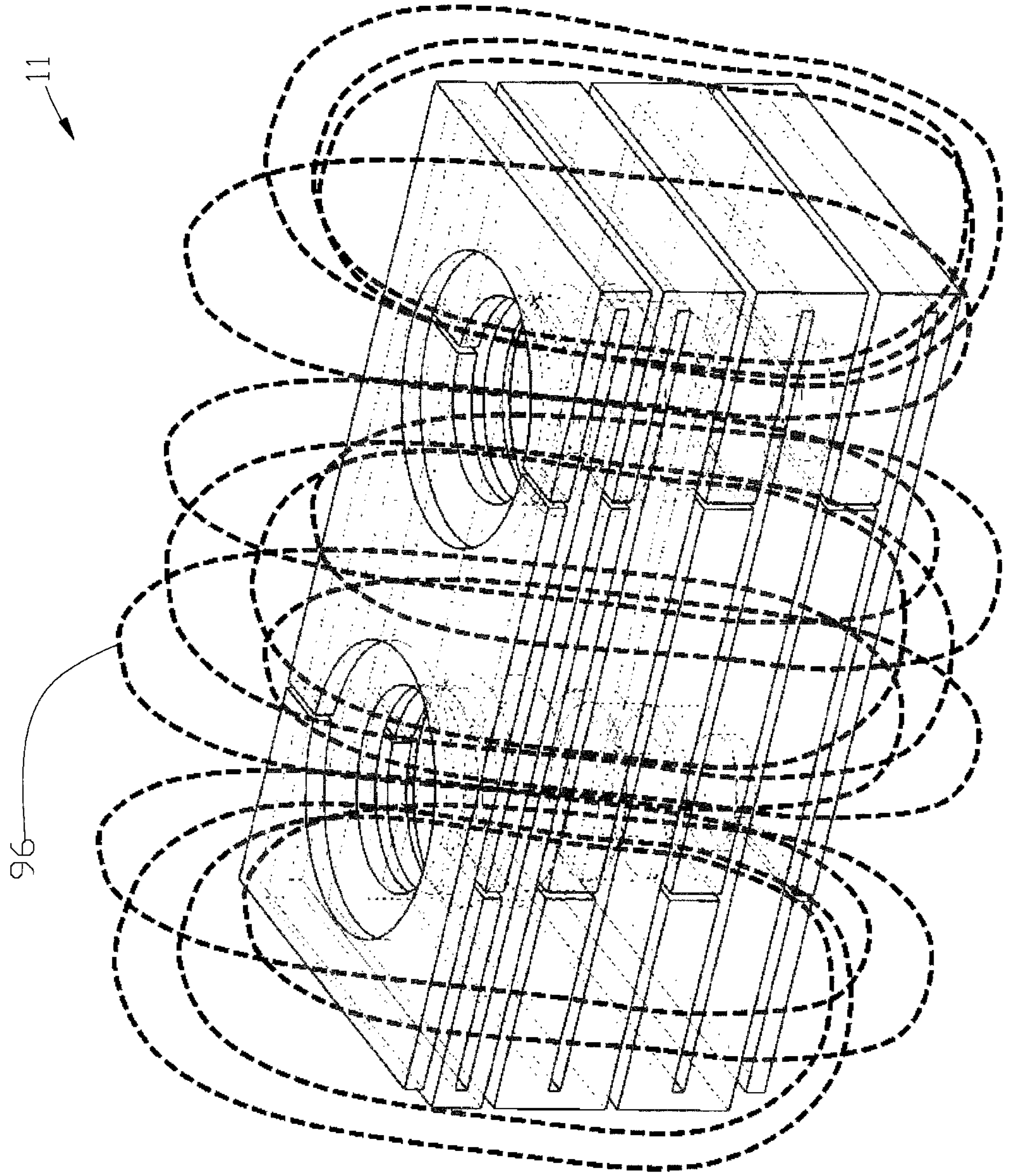
FIG. 11 illustrates one non-limiting example of a typical solenoidal magnetic field pattern in dashed lines when instantaneous alternating current is applied to a multi-layer parallel plane inductor of the present invention.

The linkage of magnetic flux that is generated by each one of the currents in the vortex produces the magnetic field distribution 96 that is shown by dotted lines in FIG. 11 within and around coil control pockets A' and B' where the overall final distribution of the magnetic flux linkage between layers resembles the magnetic field dispersion that is produced by a solenoidal coil as illustrated in FIG. 11.

Figure 12A:
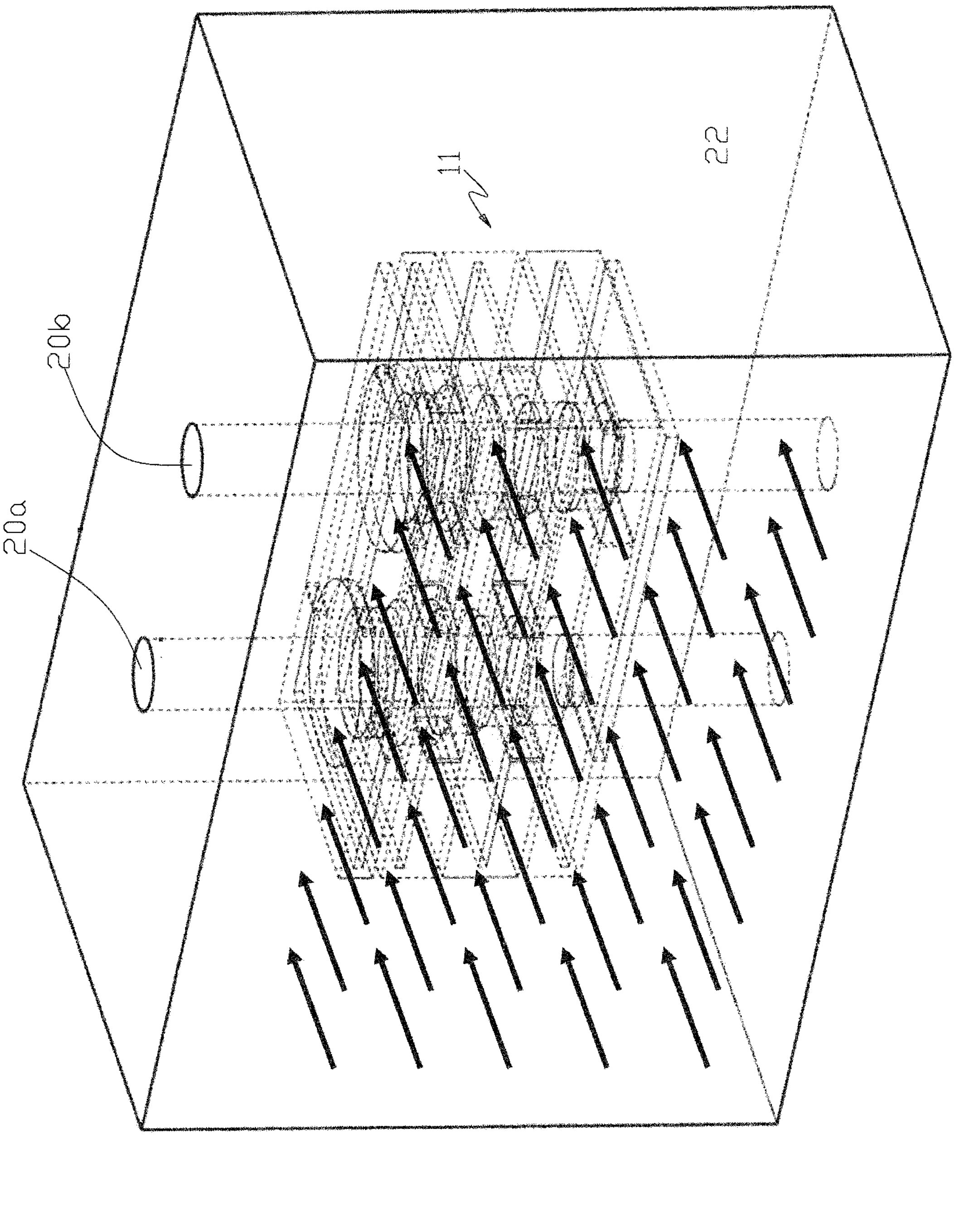
FIG. 12(*a*) and FIG. 12(*b*) illustrate two non-limiting examples of a cooling apparatus used with a multi-layer parallel plane inductor of the present invention.
Figure 12B:
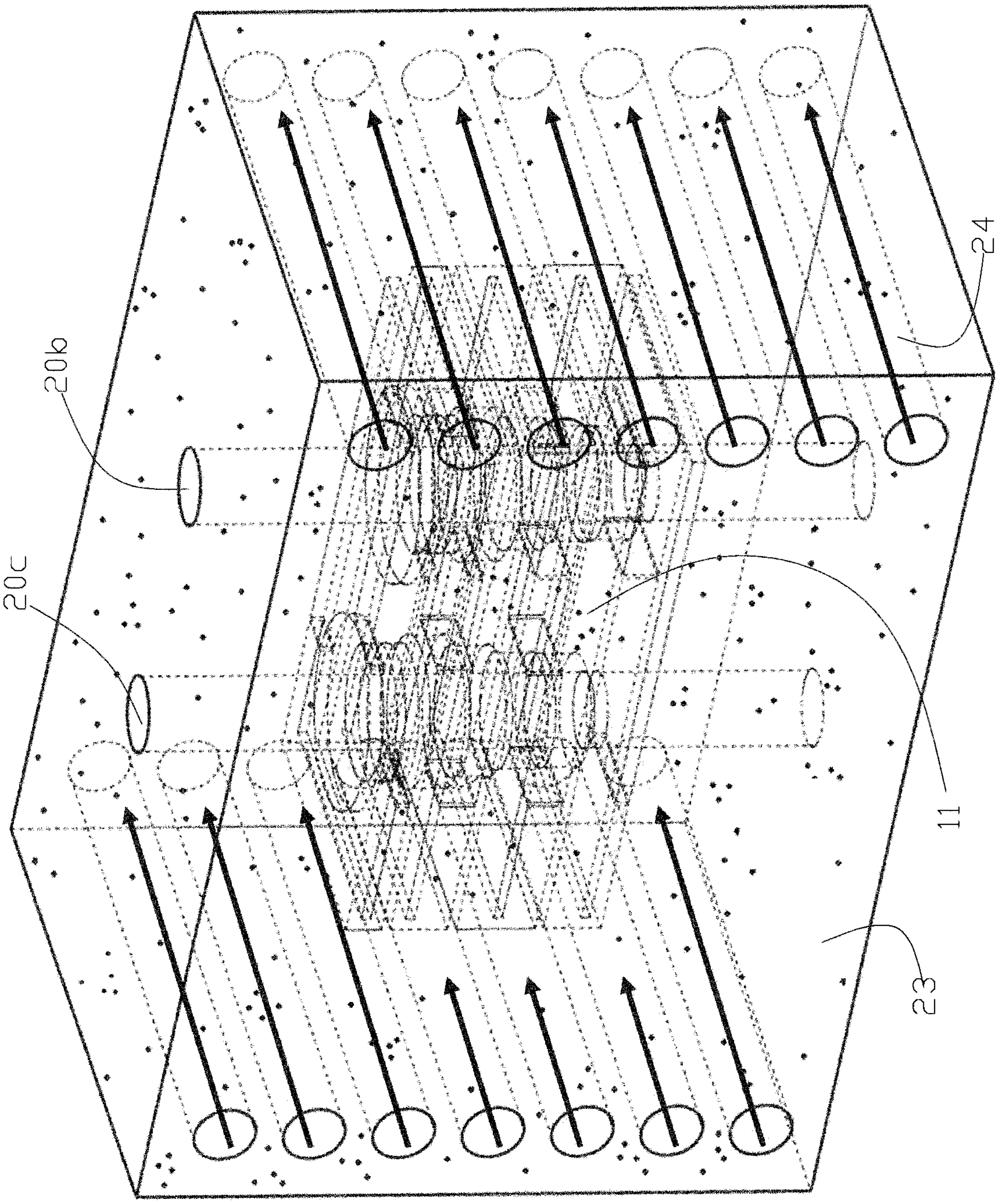

FIG. 12(*a*) illustrates one non-limiting method of cooling a high current multi-layer parallel plane inductor of the present invention by external cooling. A multi-layer parallel plane inductor of the present invention (for example inductor 10 or 11) is fixtured within sealed cooling enclosure 22. Suitable cooling medium such as water or oil can be contained within cooling enclosure 22 with the cooling system being either self-contained or a recirculating system. Arrows in FIG. 12(*a*) represent one preferable but not limiting direction of cooling medium through the high current multi-layer parallel plane inductor. The separation gaps between layers of the inductor provides a passthrough for the cooling medium to cool the layers. Quartz or other types of suitable enclosed passages 20*a* and 20*b* are used as load (workpiece) transport containers through coil control pockets (for example A or A' and B or B') without contact to the cooling medium since the entry and exit openings of the tubes are located outside of the top and bottom of the sealed cooling enclosure. The tubes or other types of workpiece transport apparatus may be any material that is suitably transparent to electromagnetic energy and the thermal environment.

Opposing ends of the inductor electrical terminals T1 and T2 can be isolated from the environment exterior to the cooling enclosure by a watertight seal through which power conductors can be connected to inductor terminals T1 and T2.

FIG. 12(*b*) illustrates an alternative method of cooling a high current multi-layer parallel plane inductor of the present invention by external cooling. The multi-layer parallel plane inductor of the present invention (for example inductor 10 or 11) is fixtured within sealed cooling enclosure 23 with a magnesium oxide composition encasing a multi-layer parallel plane inductor of the present invention inside the cooling enclosure. Cooling passages 24 (14 total in this example) provide a path for a cooling medium to flow through the sealed cooling enclosure 23 with load (workpieces) passing through quartz tubes 20*c* and 20*d* that may be configured similarly to the enclosed passages 20*a* and 20*b* in FIG. 12(*a*).

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A high current multi-layer parallel plane inductor comprising:

a plurality of electrically conductive continuous layers folded back and forth and separated from each other by a separation gap height to form a compact series inductor, each one of the plurality of electrically conductive continuous layers having a layer height;

one or more coil control pockets, each one of the one or more coil control pockets formed from at least one layer pocket hole in each one of the plurality of electrically conductive continuous layers, the at least one layer pocket hole in each one of the plurality of electrically conductive continuous layers having a layer first edge notch or a layer second edge notch for selectively directing an alternating current supplied to each of the at least one layer pocket hole in each one of the plurality of electrically conductive continuous layers to generate a magnetic field in each of the one or more coil control pockets, the magnetic field controlled by a configuration of the at least one layer pocket hole in each one of the plurality of electrically conductive continuous layers forming each one of the one or more coil control pockets;

wherein the layer first edge notch extends perpendicularly from a first edge of each of the plurality of electrically conductive continuous layers to the at least one layer pocket hole and the layer second edge notch extends perpendicularly from a second edge of each of the plurality of electrically conductive continuous layers to the at least one layer pocket hole; and wherein a diameter of at least one layer pocket hole is different than the diameter of at least one of a remainder of the layer pocket holes, wherein the layer pocket holes for alternating ones of the plurality of electrically conductive continuous layers have reversed the layer first edge notches and the layer second edge notches, such that each consecutive layer pocket hole of the one or more coil control pockets alternates between having the layer first edge notch and the layer second edge notch.

2. The high current multi-layer parallel plane inductor of claim 1 further comprising a first terminal inductor end manufactured as an integral feature to an end of a first layer of the high current multi-layer parallel plane inductor and a second terminal inductor end manufactured as an integral feature to an end of a final layer of the high current multi-layer parallel plane inductor.

3. The high current multi-layer parallel plane inductor of claim 1 wherein the at least one layer pocket hole comprises at least two layer pocket holes and the at least two layer pocket holes of each layer sequentially alternate between the layer first edge notch and the layer second edge notch for all of the plurality of electrically conductive continuous layers.

4. The high current multi-layer parallel plane inductor of claim 1 wherein the layer pocket holes for alternating ones of the plurality of electrically conductive continuous layers have all the layer first edge notches in a first alternating layer and the layer second edge notches in a second alternating layer.

5. The high current multi-layer parallel plane inductor of claim 1 wherein the layer pocket holes forming at least one of the one or more coil control pockets is configured to produce the magnetic field when the alternating current is applied to the high current multi-layer parallel plane inductor.

6. The high current multi-layer parallel plane inductor of claim 1 wherein the layer pocket holes forming at least one of the one or more coil control pockets is configured to produce a sinusoidal-shaped magnetic field when the alternating current is applied to the high current multi-layer parallel plane inductor.

7. The high current multi-layer parallel plane inductor of claim 6 further comprising a load positioned at least partially within the sinusoidal-shaped magnetic field.

8. The high current multi-layer parallel plane inductor of claim 1 wherein the plurality of electrically conductive continuous layers are formed from a copper or a copper alloy.

9. The high current multi-layer parallel plane inductor of claim 1 wherein the layer height of at least one of the plurality of electrically conductive continuous layers is not equal to the layer height of a remainder of the plurality of electrically conductive continuous layers.

10. The high current multi-layer parallel plane inductor of claim 1 wherein the separation gap height between at least two of the plurality of electrically conductive continuous layers is different than a separation distance between a remainder of the plurality of electrically conductive continuous layers.

11. The high current multi-layer parallel plane inductor of claim 1 further comprising a cooling apparatus externally enclosing the high current multi-layer parallel plane inductor.

12. The high current multi-layer parallel plane inductor of claim 11 wherein the cooling apparatus comprises:

an exterior enclosure for containing the high current multi-layer parallel plane inductor and a cooling medium;

a load passageway through the exterior enclosure for each one of the coil control pockets; and at least one cooling medium pump for circulating the cooling medium through the separation gap height between the plurality of electrically conductive continuous layers in the high current multi-layer parallel plane inductor.

13. The high current multi-layer parallel plane inductor of claim 11 wherein the cooling apparatus comprises:

an exterior enclosure for containing the high current multi-layer parallel plane inductor encased in a magnesium oxide; and a load passageway through the exterior enclosure for each one of the coil control pockets and at least one through cooling medium passageway encased in the magnesium oxide.

14. The high current multi-layer parallel plane inductor of claim 1, wherein the layer first edge notch and the layer second edge notch are disposed parallel to each transverse fold region of a plurality of transverse fold regions defined between the plurality of electrically conductive continuous layers, the plurality of transverse fold regions extending linearly between the first edge and the second edge.

15. The high current multi-layer parallel plane inductor of claim 1, wherein each layer pocket hole of the at least one layer pocket hole is defined entirely within a perimeter of the high current multi-layer parallel plane inductor, wherein the perimeter is defined by the first edge and the second edge and a first terminal inductor end of the high current multi-layer parallel plane inductor and a second terminal inductor end of the high current multi-layer parallel plane inductor, the first edge parallel to the second edge and the first terminal inductor end parallel to the second terminal inductor end.

16. A method of manufacturing a high current multi-layer parallel plane inductor comprising a plurality of electrically conductive continuous layers folded back and forth and separated from each other by a separation gap height to form a compact series inductor, each one of the plurality of electrically conductive continuous layers having a layer height; and one or more coil control pockets, each one of the one or more coil control pockets formed from at least one layer pocket hole in each one of the plurality of electrically conductive continuous layers, the at least one layer pocket hole in each one of the plurality of electrically conductive continuous layers having a layer first edge notch or a layer second edge notch for selectively directing an alternating current supplied to each of the at least one layer pocket hole in each one of the plurality of electrically conductive continuous layers to generate a magnetic field in each of the one or more coil control pockets, the magnetic field controlled by a configuration of the at least one layer pocket hole in each one of the plurality of electrically conductive continuous layers forming each one of the one or more coil control pockets, the method comprising:

forming an inductor preform having the plurality of electrically conductive continuous layers in a linear configuration from an electrically conductive solid block stock;

forming the at least one layer pocket hole for each layer;

forming the layer first edge notch and the layer second edge notch for each layer pocket hole of the at least one layer pocket hole, wherein each layer first edge notch extends perpendicularly from a first edge of the plurality of electrically conductive continuous layers to the layer pocket hole and each second edge notch extends perpendicularly from a second edge of the plurality of electrically conductive continuous layers to the layer pocket hole; and folding back and forth the inductor preform along a plurality of transverse fold regions defined perpendicularly between the first edge and the second edge to produce the high current multi-layer parallel plane inductor, wherein the plurality of transverse fold regions are disposed between each layer of the plurality of electrically conductive continuous layers, wherein the layer pocket holes for alternating ones of the plurality of electrically conductive continuous layers have reversed the layer first edge notches and the layer second edge notches, such that each consecutive layer pocket hole of the one or more coil control pockets alternates between having the layer first edge notch and the layer second edge notch.

17. The method of claim 16 wherein the at least one layer pocket hole and the layer first edge notch and the layer second edge notch of each layer of the plurality of electrically conductive continuous layers is formed by a CNC machine and one or more tools selected from machine tools, die presses, water jets and wire electrical discharge machining to reveal the elements of the high current multi-layer parallel plane inductor.

18. A method of generating a sinusoidal-like magnetic field with a high current multi-layer parallel plane inductor comprising a plurality of electrically conductive continuous layers folded back and forth and separated from each other by a separation gap height to form a compact series inductor, each one of the plurality of electrically conductive continuous layers having a layer height; and one or more coil control pockets, each one of the one or more coil control pockets formed from at least one layer pocket hole in each one of the plurality of electrically conductive continuous layers, wherein a diameter of at least one layer pocket hole is different than the diameter of at least one of a remainder of the layer pocket holes, the at least one layer pocket hole in each one of the plurality of electrically conductive continuous layers having a layer first edge notch or a layer second edge notch for selectively directing an alternating current supplied to each of the at least one layer pocket hole in each one of the plurality of electrically conductive continuous layers, wherein the layer first edge notch extends perpendicularly from a first edge of each of the plurality of electrically conductive continuous layers to the at least one layer pocket hole and the layer second edge notch extends perpendicularly from a second edge of each of the plurality of electrically conductive continuous layers to the at least one layer pocket hole, the alternating current selectively directed to generate a magnetic field in each of the one or more coil control pockets, the magnetic field controlled by a configuration of the at least one layer pocket hole in each one of the plurality of electrically conductive continuous layers forming each one of the one or more coil control pockets, wherein the layer pocket holes for alternating ones of the plurality of electrically conductive continuous layers have reversed the layer first edge notches and the layer second edge notches, such that each consecutive layer pocket hole of the one or more coil control pockets alternates between having the layer first edge notch and the layer second edge notch.

19. The method of claim 18 further comprises placing a load at least partially within at least one of the coil control pockets, the load at least partially formed from an electrically conductive material for interaction with the sinusoidal-like magnetic field to electromagnetically heat, heat treat or anneal the load.

* * * * *